United States Patent Office 3,073,744
Patented Jan. 15, 1963

3,073,744
THERAPEUTIC COMPOSITIONS AGAINST
VIRUS DISEASES
Bengt Olof Melander, Stockholm, and Tore Ragnar
Nilsson, Bromma, Sweden, assignors to A/B Kabi,
Stockholm, Sweden, a corporation of Sweden
No Drawing. Filed Oct. 22, 1959, Ser. No. 847,872
17 Claims. (Cl. 167—65)

This invention is that of a therapeutic composition comprising a physiologically acceptable acid addition salt of $N^1,N^1$-anhydrobis-($\beta$-hydroxyethyl)biguanide, briefly referred to herein as ABOB, and effective for the treatment of virus diseases in man and other susceptible animals. Such composition in clinical use combines activity against several viruses of such different types as influenza, acute respiratory diseases, common cold, herpes zoster, smallpox, New Castle disease and canine distemper with an unusual low toxicity resulting in a high safety factor (i.e. high therapeutic index). The favourable influence of compositions according to the present invention has been clearly demonstrated, i.e. in clinical influenza.

The invention is also that of the method of combatting a virus infection, such as any of those just named, in a host infected with such virus infection, which method comprises administering to the thus injected host a virus combatting effective dosage of a composition comprising a pharmaceutically acceptable acid addition salt of ABOB.

The therapeutic composition of the invention is effective when administered orally or parenterally. For clinical use with humans generally dosage forms for oral administration are advantageous by avoiding the patent's apprehension against injections.

The effective agent in the composition of the invention is a physiologically acceptable acid addition salt of $N^1,N^1$-anhydrobis-($\beta$-hydroxyethyl)biguanide i.e. ABOB, e.g., the hydrochloride according to the following formula:

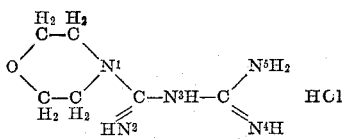

The expression "physiologically acceptable" used herein is the recognized equivalent for the expression "physiologically innocuous" or "pharmaceutically acceptable" or "therapeutically acceptable" often used to designate a substance which is physiologically innocuous when taken in a regimen (i.e. frequency of administration) that is effective for its indicated therapeutic use.

Thus, the anion of the acid used to produce any such physiologically innocuous acid addition salt as any of those exemplified hereinabove and hereinbelow, often is referred to as a physiologically, or pharmaceutically, or therapeutically, acceptable anion, so that the related acid addition salts can be referred to as an acid addition salt of the biguanide base, is ABOB having a pharmaceutically acceptable anion.

Thus, the physiologically innocuous acid addition salts of the biguanide ABOB included in the compositions of the invention are, e.g., those of a mineral acid, such as a hydrohalide as the hydrochloride or the hydrobromide, the phosphate, nitrate or sulfate; or of an aliphatic acid such as a mono-, di-, or tricarboxylic acid, as the acetate, ascorbate, citrate, fumarate, glycolate, lactate, levulinate, maleate, succinate, or tartrate; or of an aliphatic sulfonic acid as the methanesulfonate and ethane-disulfonate; or of a heterocyclic acid, as the nicotinate.

The ABOB hydrochloride used in the composition according to the invention is prepared, i.e. as follows:
43.5 g. tetrahydro-1,4-oxazine, 41.7 ml. concentrated hydrochloric acid, 40 ml. water, and 42 g. dicyandiamide are refluxed for 48 hours, whereupon the reaction mixture is cooled to +5° C. and filtered. The filtrate is evaporated to dryness and extracted with boiling ethanol. Yield: 50 g. The formed $N^1,N^1$-anhydrobis-($\beta$-hydroxyethyl)biguanide-HCl is purified by recrystallization from ethanol. M.P.: 210–212° C.

Then any other herein indicated pharmaceutically or pharmacologically innocuous acid addition salt of the biguanide ABOB can be prepared by simply changing the method as readily recognized by the ordinary organic chemist engaged in that field by readily available methods. E.g., instead of using concentrated hydrochloric acid in its preparation, there can be used some other suitable concentrated hydrogen halide such as hydrobromic acid, to obtain the corresponding hydrohalide, e.g. the hydrobromide.

Alternatively, the free base of such biguanide derivative is prepared, i.e., 2.1 g. $N^1,N^1$-anhydrobis-($\beta$-hydroxyethyl)biguanide-HCl is dissolved in 100 ml. water and treated with an anion exchange material. The resulting solution is neutralized with maleic acid and evaporated to crystallization upon which $N^1,N^1$-anhydrobis-($\beta$-hydroxyethyl)biguanide maleate is obtained. It is then neutralized in suitable aqueous or organic solvent medium with the respective mineral or organic acid whose acid addition salt is desired, e.g., in an amount preferably just stoichiometrically equivalent to, and otherwise perhaps only just slightly in excess of, that required to form such acid addition salt. The resulting salt then is separated from the solvent vehicle in known manner. Such acids to be added, e.g., in ether solution are, e.g., glacial acetic acid, fumaric acid, maleic acid, phosphoric acid or tartaric acid, thereby to yield the ABOB acetate, fumarate, maleate, phosphate, or tartrate respectively. The selected acid whose acid addition salt is to be prepared can be dissolved in any other suitable, advantageously readily evaporatable solvent for it which is miscible with ether, or with propanol or isopropanol, depending on which solvent was used for the free base, and the desired addition salt similarly prepared.

Thus, e.g., with nitric acid, sulphuric acid, phosphoric acid, acetic acid, citric acid, fumaric acid, glycolic acid, lactic acid, levulinic acid, ascorbic acid, maleic acid, succinic acid, tartaric acid, methanesulphonic acid, ethanesulphonic acid, and nicotinic acid, using each of them separately respectively with the biguanide ABOB (i.e. as the base), there is obtained separately respectively the corresponding acid addition salt of the free base ABOB, each of which such acid addition salt is considered as herein disclosed, i.e. starting with $N^1,N^1$-anhydrobis-($\beta$-hydroxyethyl)biguanide, nitrate, sulphate, phosphate, acetate, citrate, and so correspondingly respectively on to $N^1,N^1$-anhydrobis-($\beta$-hydroxyethyl)biguanide nicotinate.

The compositions according to the invention, comprising any selected such acid addition salt of ABOB are used clinically, i.e., as sterile solutions comprising, say, from 50 to 100 mg./ml. of ABOB. Tablets, coated tablets, and capsules comprising any such acid addition salt of ABOB at from 50 to 100 mg./dosage unit are also employed. Elixirs with the same basic composition as the sterile solution also can be used. An effective dosage schedule covers a range from about 50 mg. to about 400 mg. two to three times daily. Such dosage regimens result in statistically significant differences in clinical studies in favour of the compositions according to the invention as compared with the controls receiving placebo medication.

There are, thus wide dose ranges available for compositions of the invention. Practical limits are for such salt of the biguanide ABOB from about 25 mg. to about 500 mg. In the following examples below which illustrate the invention, preferred dose units are given, without limiting the invention thereto.

Example 1

Sterile solution, composition:

| | G. |
|---|---|
| $N^1,N^1$ - anhydrobis-($\beta$-hydroxyethyl)biguanide-HCl | 100 |
| Water for injection | 926 |

*Preparation.*—ABOB hydrochloride is dissolved in 500 g. of the calculated amount of sterile water. The resulting solution is made up to the calculated end volume with sterile water. The final solution then is sterilized by filtration through a Seitz EKS asbestos filter pad, and aseptically subdivided into sterile vials, 10 ml. in each vial. The vials are stoppered with sterile rubber stoppers and sealed with metal caps. This solution in these vials contains 100 mg. of ABOB hydrochloride per ml.

Example 2

Tablets, composition:

| | Mg. |
|---|---|
| $N^1,N^1$ - anhydrobis-($\beta$-hydroxyethyl)biguanide-HCl | 100 |
| Wheat starch | 15 |
| Lactose | 33.5 |
| Magnesium stearate | 1.5 |

*Preparation.*—A granulation obtained upon mixing lactose with the starch and granulated starch paste is dried, screened and mixed with ABOB-HCl and magnesium stearate. The mixture is compressed into tablets weighing 150 mg. each, and with 7 mm. diameter.

Example 3

Sugar coated tablets, composition:

| | Mg. |
|---|---|
| $N^1,N^1$ - anhydrobis-($\beta$-hydroxyethyl)biguanide-HCl | 100 |
| Wheat starch | 15 |
| Lactose | 33.5 |
| Magnesium stearate | 1.5 |

*Preparation.*—The tablet granulation is prepared as described in Example 2 and compressed into cores in a concave punch with 7 mm. diameter. Tablet weight 150 mg.

The cores are coated with sucrose solution added together with a dusting powder consisting of sucrose and talc. The coating mixture is coloured with erythrosine.

Example 4

Effervescent tablets, composition:

| | Mg. |
|---|---|
| $N^1,N^1$ - anhydrobis-($\beta$-hydroxyethyl)-biguanide-HCl | 100 |
| Tartaric acid | 296 |
| Sodium bicarbonate | 334 |
| Sodium cyclamate | 10 |
| Gelatin | 3.5 |
| Polyethylene glycol 6000 | 6.5 |

*Preparation.*—$N^1,N^1$ - anhydrobis-($\beta$-hydroxyethyl)biguadine-HCl and sodium cyclamate are mixed together and granulated with an aqueous solution of the gelatin and polyethylene glycol 600. The tartaric acid and sodium bicarbonate are each also granulated separately with this solution. The three granulations are dried, screened and mixed together. The mixed granulations are compressed into tablets, weighing 750 mg. and with 13 mm. diameter.

Example 5

Capsules, composition:

A mixture is prepared containing equal parts by weight of $N^1,N^1$-anhydrobis-($\beta$-hydroxyethyl)biguanide-HCl and lactose.

*Preparation.*—The mixture is filled 200 mg. a capsule into standard clear gelatin telescopic capsules and after closing the capsules are preferably dusted with talc or corn-starch. The resulting capsules contain per dose unit 100 mg. of ABOB.

Example 6

Elixir, composition:

| | G. |
|---|---|
| $N^1,N^1$ - anhydrobis - ($\beta$ - hydroxyethyl)biguanide-HCl | 2 |
| Sorbitol, 70% | 35 |
| Methylparaben | 0.1 |
| Citric acid | 0.2 |
| Sodium cyclamate | 0.05 |
| Cacao flavour | 0.002 |
| Peppermint oil | 0.002 |
| Alcohol, 95% | 5 |
| Water to make 100 ml. | |

*Preparation.*—$N^1,N^1$ - anhydrobis-($\beta$-hydroxyethyl)biguanide-HCl, citric acid and sodium cyclamate are dissolved in water. Sorbitol is added. The other flavouring agents are dissolved in alcohol and added.

While the therapeutic compositions of the several specific examples comprise the hydrochloride of ABOB, that hydrochloride can be replaced in each of the examples by the equivalent quantity as this biguanide of some other therapeutically acceptable hydrohalide of it or of some other therapeutically acceptable acid addition salt of it of the type broadly described herein above and specifically of any of them which is specifically referred to herein. Thus, each of these specific examples is considered as repeated in full but with such an equivalent amount of each of these other specific acid addition salts of ABOB respectively separately thus replacing its hydrochloride.

The composition of the invention is not limited to any such acid addition salts in the specific solid or liquid pharmaceutically acceptable vehicle of the individual examples. The method of the invention comprises administering to a host (human or other susceptible animal) infected with any herin named virus infection a such virus combatating effective dosage of a composition comprising a pharmaceutically acceptable acid addition salt of ABOB, i.e., its hydrochloride at a dosage, say from about 50 to about 400 mg. The hydrochloride, of course, can be replaced in this method by the ABOB equivalent quantity of any other of its pharmaceutically acceptable acid addition salts.

While the invention has been illustrated by giving detailed descriptions of certain specific embodiments of it, it is understood that various modifications and/or substitutions can be made in any of the specific embodiments within the scope of the invention as broadly disclosed herein and of the appended claims which are intended also to cover equivalents of the various specific embodiments.

This application is a continuation-in-part application of our copending application Serial No. 456,878 filed September 17, 1954, now abandoned.

We claim:

1. The method of resisting as well as suppressing an influenza virus infection in a host susceptible to infection therewith, which comprises administering to such host an influenza virus combatting effective dosage of a composition comprising a pharmaceutically acceptable acid addition salt of N',N'-anhydrobis-(beta-hydroxyethyl)biguanide, wherein said dosage is within the range of from about 25 to about 500 milligrams of said acid addition salts.

2. The method as claimed in claim 1, wherein the acid addition salt is a hydrohalide.

3. The method as claimed in claim 2, wherein the acid addition salt is the hydrochloride.

4. The method of combating a herpes zoster infection in a host susceptible to infection therewith, which comprises administering to such host a herpes zoster combatting effective dose of a pharmaceutically acceptable acid addition salt of N',N'-anhydro-bis-(beta-hydroxyethyl)biguanide, wherein said dosage is within the range of from about 25 to about 500 milligrams of said acid addition salt.

5. The method as claimed in claim 4, wherein the acid addition salt is a hydrohalide.

6. The method as claimed in claim 5, wherein the acid addition salt is the hydrochloride.

7. The method of resisting as well as suppressing a virus-induced respiratory infection in a host susceptible to infection therewith, which comprises administering to such host a virus-induced respiratory infection virus combatting effective dosage of a composition comprising a pharmaceutically acceptable acid addition salt of N',N'-anhydrobis-(beta-hydroxyethyl)biguanide, wherein said dosage is within the range of from about 25 to about 500 milligrams of said acid addition salt.

8. A pharmaceutical preparation effective for the prophylaxis, as well as for suppression, of at least one member of the class consisting of a virus-induced respiratory infection and herpes zoster in a host susceptible to a said infection, which preparation comprises in admixture a pharmaceutically acceptable acid addition salt of N'.N' - anhydrobis-(beta-hydroxyethyl)biguanide and a pharmaceutically acceptable dosage form vehicle; said mixture being in a pharamaceutically acceptable dosage form and containing per dose from about twenty-five to about five hundred milligrams of said addition salt.

9. A preparation as claimed in claim 8, which preparation is effective against an influenza virus infection.

10. A pharmaceutical preparation as claimed in claim 9, wherein the acid addition salt is a hydrohalide.

11. The preparation as claimed in claim 10, wherein the acid addition salt is the hydrochloride.

12. A preparation as claimed in claim 8, which preparation is effective against a herpes zoster infection.

13. A preparation as claimed in claim 12, wherein the acid addition salt is a hydrohalide.

14. A preparation as claimed in claim 13, wherein the acid addition salt is the hydrochloride.

15. A preparation as claimed in claim 8, which preparation contains per dose about one hundred milligrams of the addition salt.

16. A preparation as claimed in claim 15, wherein the addition salt is a hydrohalide.

17. A preparation as claimed in claim 16, wherein the hydrohalide is the hydrochloride.

References Cited in the file of this patent

UNITED STATES PATENTS

| | | |
|---|---|---|
| 2,295,884 | Winnek | Sept. 15, 1942 |
| 2,320,882 | Oldham | June 1, 1943 |
| 2,375,628 | D'Alelio et al. | May 8, 1945 |

OTHER REFERENCES

Woolley: "A Study of Anti Metabolites," John Wiley and Sons, Inc., New York, N.Y. (1952), pp. 174–176.

Curd et al.: Ann. Trop. Med. Parisitol, vol. 39, p. 157 et al. (1945).

Falco et al.: Nature, vol. 164, p. 107 et al. (1949).

Bawden et al.: Biochem. J., vol. 34, pp. 1278–92 (1940).

Supniewski et al.: Bull. Acad. Polon. Sci., Classe II, pp. 29–32, 161–5, 1954.

"The Naming and Indexing of Chemical Compounds by Chemical Abstracts," CA. 46(24), Dec. 25, 1952, page 12415:

Entry: Morpholino (4-position only) $\overline{CH_2 \cdot CH_2 \cdot O \cdot CH_2 CH_2 \cdot N}-$ Entry: Morpholinyl (2-or 3-) (3-shown) $\overline{NH \cdot CH_2 \cdot CH_2 \cdot O \cdot CH_2 \cdot CH}-$

UNITED STATES PATENT OFFICE
CERTIFICATE OF CORRECTION

Patent No. 3,073,744            January 15, 1963

Bengt Olof Melander et al.

It is hereby certified that error appears in the above numbered patent requiring correction and that the said Letters Patent should read as corrected below.

Column 1, line 32, for "patent's" read -- patient's --; lines 39 to 44, the structural formula should appear as shown below instead of as in the patent:

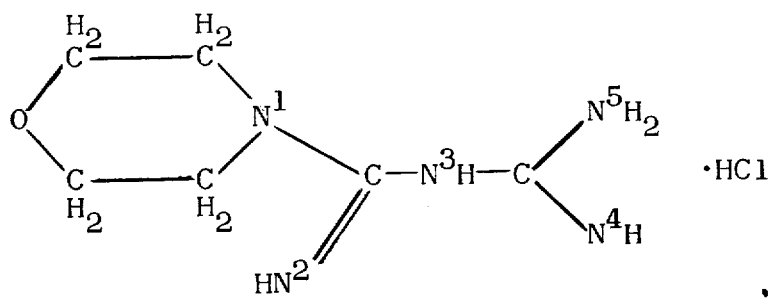

column 2, line 53, after "biguanide", strike out the comma; line 70, after "thus" insert a comma; column 3, line 62, for "600" read -- 6000 --; column 4, line 41, for "combatating" read -- combatting --; line 73, for "combating" read -- combatting --; column 5, line 25, for N'.N'" read -- N',N' --; column 6, line 22, after "Parisitol" insert a period; line 31, for "CA." read -- C.A. --.

Signed and sealed this 17th day of September 1963.

(SEAL)
Attest:

ERNEST W. SWIDER            DAVID L. LADD

Attesting Officer            Commissioner of Patents